United States Patent
Cain

(10) Patent No.: US 9,346,435 B2
(45) Date of Patent: May 24, 2016

(54) THEFT-DETERRENCE DEVICE FOR MACHINERY AND METHOD OF USE

(71) Applicant: lockurboom, LLC, Crown Point, IN (US)

(72) Inventor: Ann Marie Cain, Crown Point, IN (US)

(73) Assignee: lockurboom LLC, Crown Point, IN (US)

(*) Notice: Subject to any disclaimer, the term of this patent is extended or adjusted under 35 U.S.C. 154(b) by 0 days.

(21) Appl. No.: 14/264,176

(22) Filed: Apr. 29, 2014

(65) Prior Publication Data

US 2014/0318196 A1    Oct. 30, 2014

Related U.S. Application Data

(60) Provisional application No. 61/816,978, filed on Apr. 29, 2013.

(51) Int. Cl.
*G05G 5/00* (2006.01)
*B60R 25/00* (2013.01)

(52) U.S. Cl.
CPC ........... *B60R 25/007* (2013.01); *Y10T 70/5739* (2015.04); *Y10T 70/5832* (2015.04)

(58) Field of Classification Search
CPC ..... E05B 13/001; E05B 13/00; E05B 67/383; E05B 13/002; B60R 25/042; B60R 25/005; B60R 25/066; B60R 25/0221; B60R 25/006; B60R 25/007; B60R 25/0227; F16K 35/10; F16K 35/06; F16K 35/025; G05G 5/28; B65D 55/14; B67D 7/32; B05B 7/12; Y10T 70/5832; Y10T 70/5739

USPC ........... 70/164, 174, 177, 178, 180, 203, 212, 70/232, DIG. 57, DIG. 58
See application file for complete search history.

(56) References Cited

U.S. PATENT DOCUMENTS

| | | | | | |
|---|---|---|---|---|---|
| 716,204 | A | * | 12/1902 | DeWaldo | 70/232 |
| 1,510,289 | A | * | 9/1924 | Homers | 70/164 |
| 1,530,814 | A | * | 3/1925 | Credle | 70/178 |
| 1,780,994 | A | * | 11/1930 | Caldwell | 70/180 |
| 1,830,667 | A | * | 11/1931 | Lolley | 70/178 |
| 2,063,442 | A | * | 12/1936 | Kriege | 70/180 |
| 2,094,773 | A | * | 10/1937 | Cohick | 70/178 |
| 2,118,233 | A | * | 5/1938 | Ruggio | 137/296 |
| 2,161,509 | A | * | 6/1939 | Farber | 70/180 |
| 2,161,626 | A | * | 6/1939 | Loughner et al. | 70/180 |
| 3,623,498 | A | * | 11/1971 | Manahan et al. | 137/86 |
| 4,397,332 | A | * | 8/1983 | Sample | 137/385 |
| 5,141,119 | A | * | 8/1992 | Milazzo | 212/290 |

(Continued)

*Primary Examiner* — Lloyd Gall
(74) *Attorney, Agent, or Firm* — Hartman Global IP Law; Domenica N. S. Hartman; Michael D. Winter

(57) ABSTRACT

Theft-deterrence devices and methods adapted to assist in theft deterrence/prevention of machinery, for example, a man lift, whose controls include a joystick. Such a device includes an enclosure having an interior cavity defined by and between oppositely-disposed first and second ends of the enclosure, and an opening in the second end that communicates with the cavity and sized to enable a joystick to pass therethrough into the cavity. The cavity accommodates at least a portion of the joystick sufficient to prevent operation thereof. The device further includes an arm having a first portion permanently attached to the enclosure, a third portion comprising a through-hole that enables a shackle of a locking device to pass therethrough, and a second portion that permanently joins the first and third portions.

19 Claims, 2 Drawing Sheets

(56) References Cited

U.S. PATENT DOCUMENTS

| | | | |
|---|---|---|---|
| 5,143,114 A * | 9/1992 | Daniels | 137/385 |
| 5,469,724 A * | 11/1995 | Pollard | 70/178 |
| 5,784,907 A * | 7/1998 | Hu et al. | 70/203 |
| 5,806,555 A * | 9/1998 | Magno, Jr. | 137/385 |
| 6,250,589 B1 * | 6/2001 | Russ et al. | 244/224 |
| 6,658,906 B1 * | 12/2003 | Wright | 70/455 |
| 6,691,732 B2 * | 2/2004 | Fleury et al. | 137/296 |
| 6,941,964 B1 * | 9/2005 | Hess et al. | 137/1 |
| 2003/0024284 A1 * | 2/2003 | Erickson | 70/177 |
| 2003/0121298 A1 * | 7/2003 | Hancock et al. | 70/203 |
| 2005/0211300 A1 * | 9/2005 | Hess et al. | 137/382 |
| 2008/0022733 A1 * | 1/2008 | Abe | 70/180 |
| 2008/0092609 A1 * | 4/2008 | Markbreit | 70/254 |
| 2010/0108921 A1 * | 5/2010 | Milbeck et al. | 251/90 |

\* cited by examiner

THEFT-DETERRENCE DEVICE FOR MACHINERY AND METHOD OF USE

CROSS REFERENCE TO RELATED APPLICATIONS

This application claims the benefit of U.S. Provisional Application No. 61/816,978, filed Apr. 29, 2013, the contents of which are incorporated herein by reference.

BACKGROUND OF THE INVENTION

The present invention generally relates to security devices and mechanisms. More particularly, this invention relates to a theft-deterrence device suitable for use with machinery, a particular example of which is a man lift, so as to prevent theft of the machinery.

Man lifts (also known as an elevated work platforms, cherry pickers, boom lifts, basket cranes, hydra ladders, etc.) and other heavy machinery are often used at construction and other job sites. Man lifts typically comprise a work platform (for example, a "bucket") coupled to a lift arm, often telescoping and/or articulating, that is operated by a hydraulic lift system to enable the platform to be raised to an elevated position. Certain types of man lifts are mounted on vehicles such as trucks and trailers, while others are configured as stand-alone self-propelled vehicles. The platform is often equipped with controls for operating the lift arm and its hydraulic system to enable an individual on the platform to control the position of the platform, and in some cases operate the vehicle to which the platform is mounted. Because operation of a man lift involves three-dimensional movement of the platform, the operation of a man lift is often through the use of a joystick (control column) as an input device.

Man lifts are often left unattended at job sites for extended periods of time, and as a result become susceptible to theft and misuse. Accordingly, there is a need to reduce the risk of theft and misuse, but preferably in a manner that can be readily applied and removed by authorized personnel.

BRIEF DESCRIPTION OF THE INVENTION

The present invention provides a device and method adapted to assist in theft deterrence or theft prevention of a man lift or similar machinery whose controls may include a joystick.

According to one aspect of the invention, a theft-deterrence device includes an enclosure having a first end, an oppositely-disposed second end, an interior cavity defined by and between the first and second ends, and an opening in the second end and in communication with the interior cavity. The opening is sized to enable a joystick to pass therethrough into the interior cavity and the interior cavity is sized to accommodate at least a portion of the joystick sufficient to prevent operation of the joystick. The device further includes an arm having at least first, second and third arm portions. The first arm portion is permanently attached to the enclosure, the third arm portion comprises a through-hole sized and configured to enable a shackle of a locking device to pass therethrough, and the second arm portion permanently joins the first and third arm portions.

Another aspect of the invention is a method of using a theft-deterrence device comprising the elements described above. Such a method includes installing the theft-deterrence device on machinery by passing a joystick of the machinery through the opening of the enclosure into the interior cavity of the enclosure so that the interior cavity accommodates at least a portion of the joystick sufficient to prevent operation of the joystick. The theft-deterrence device is then locked to the machinery with a locking device that comprises a shackle that passes through the through-hole of the third arm portion, such that the locking device prevents removal of the joystick from the enclosure.

According to another aspect of the invention, a method is provided for deterring the theft and misuse of machinery comprising controls that include a joystick. The method includes installing a theft-deterrence device on the machinery by passing the joystick through an opening into an interior cavity of an enclosure of the theft-deterrence device so that the interior cavity accommodates at least a portion of the joystick sufficient to prevent operation of the joystick. The theft-deterrence device is then locked to the machinery with a locking device that comprises a shackle that passes through a through-hole of the theft-deterrence device, so that the locking device prevents removal of the joystick from the enclosure.

Technical effects of the methods and devices described above preferably include the capability of reducing the risk of theft and misuse of machinery of types that are often left unattended at job sites for extended periods of time, while doing so in a manner that can be readily installed and removed by authorized personnel.

Other aspects and advantages of this invention will be better appreciated from the following detailed description.

DETAILED DESCRIPTION OF THE INVENTION

FIGS. 1 through 4 illustrate an embodiment of a theft-deterrence device 10 of a type proposed by the present invention. To facilitate the description of the device 10 provided below, relative terms, including but not limited to, "vertical," "horizontal," "lateral," "front," "rear," "side," "forward," "rearward," "upper," "lower," "above," "below," "right," "left," etc., may be used in reference to the orientation of the device 10 in an installation position represented in FIG. 4, and therefore are relative terms that indicate the construction, installation and use of the invention and therefore help to define the scope of the invention.

Figure 4:
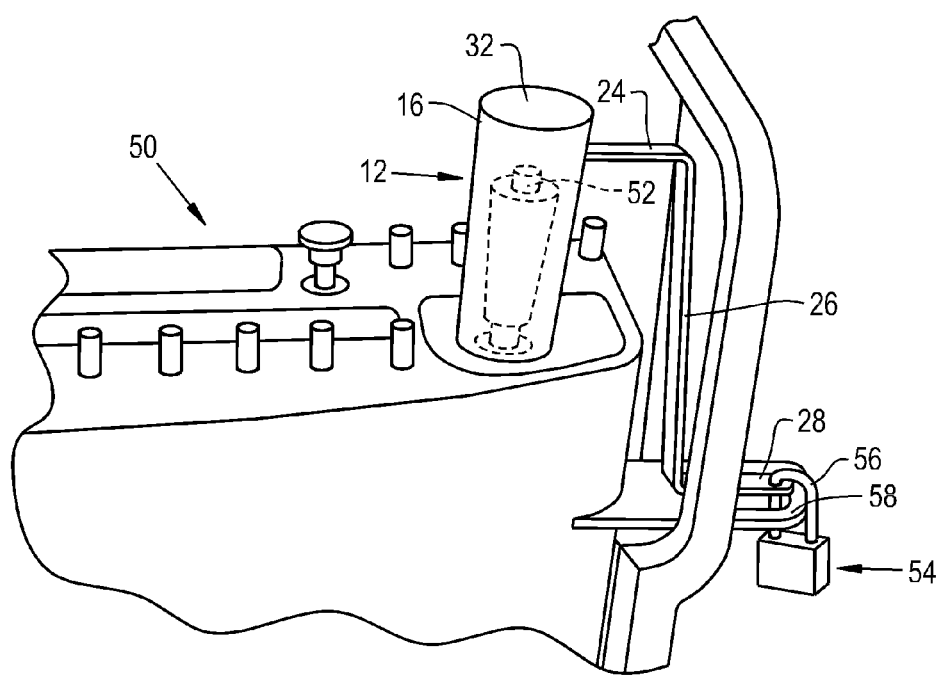
FIG. 4 represents a perspective view showing the device of FIGS. 1, 2 and 3 installed to prevent access to a joystick of a man lift.

The theft-deterrence device 10 is represented as being configured as a locking mechanism, in that the device 10 has means by which a lock 54 (FIG. 4) can be installed to secure the device 10 to machinery, particularly a man lift 50 partially represented in FIG. 4. The lock 54 is represented as a keyed padlock, though the device 10 can be secured with any suitable type of mechanical or electronic fastening device that is capable of securing and releasing the device 10 from machinery through the use of, for example, a key, keycard, fingerprint, RFID card, security token, information (such as a keycode or password), etc.

The embodiment of the device 10 represented in FIGS. 1 through 4 includes an enclosure 12 having oppositely-disposed upper and lower ends 16 and 18. The enclosure 12 is represented as having a tubular shape with a circular cross-section that defines a cylindrical interior cavity 20 capable of enclosing at least a portion if not the entirety of the joystick 52 of the man lift 50 to prevent operation of the joystick 52. However, the enclosure 12 could be formed to have other shapes, such as a triangular or square-shaped tube that can be slipped over joysticks of the type used as a control input to machinery, as nonlimiting examples, joysticks having lengths of about fifteen centimeters and longer and cross-sectional dimensions of about six centimeters and greater. The enclosure 12 is preferably formed from a high-strength material, nonlimiting examples of which include high-strength steels. The interior cavity 20 of the enclosure 12 is defined by and between the upper and lower ends 16 and 18 of the enclosure 12, and an opening 22 in the lower end 18 communicates with the cavity 20. The opening 22 is sized to enable the joystick 52 to pass therethrough into the cavity 20. The upper end 16 of the enclosure 12 depicted in FIGS. 1 through 4 is completely closed by a wall 32 to prevent access to the interior cavity 20 through the upper end 16. Preferred embodiments are believed to limit access to the interior cavity 20 solely through the opening 22 in the lower end 18 of the enclosure 12, though such a configuration is not required.

Figure 1:
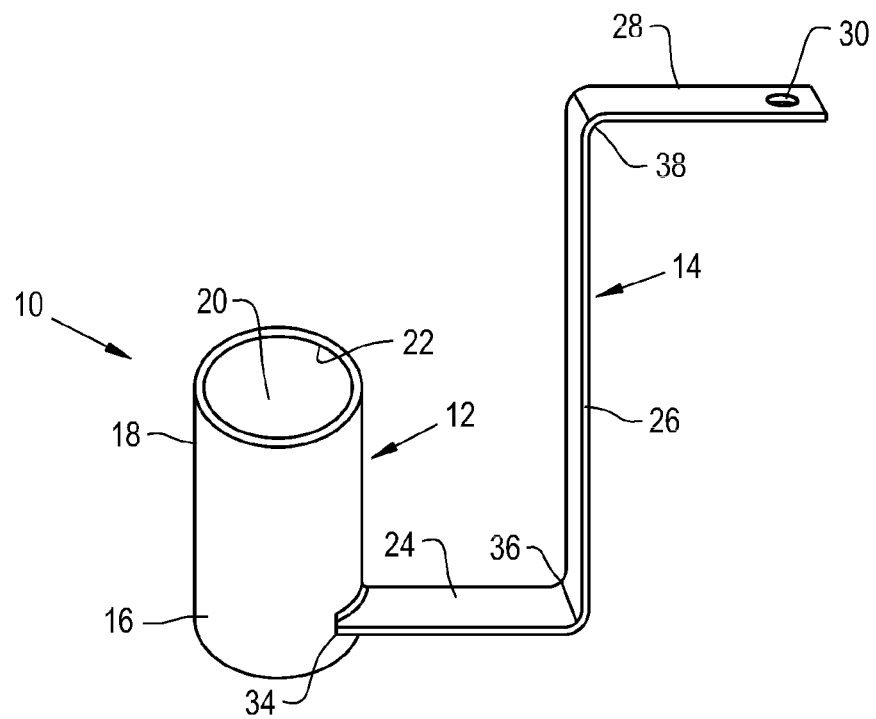
FIGS. 1, 2 and 3 are three different views of a theft-deterrence device in accordance with a nonlimiting embodiment of this invention.
Figure 2:
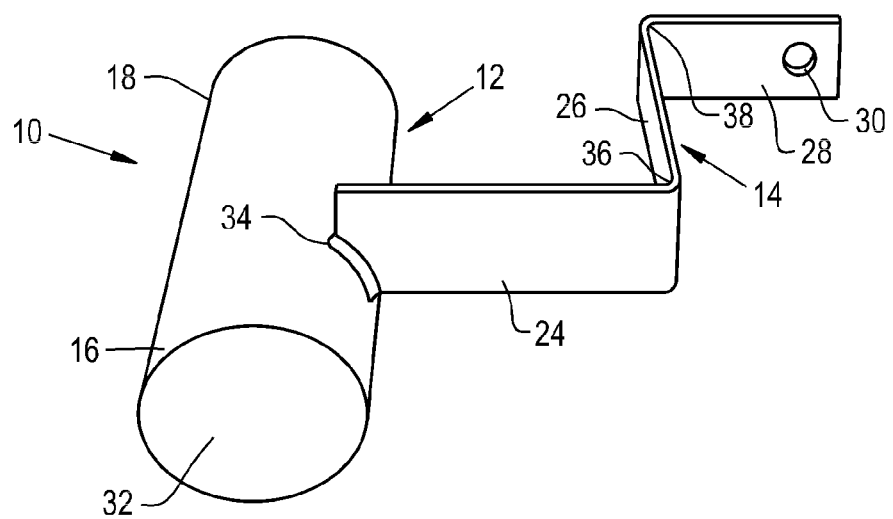
Figure 3:
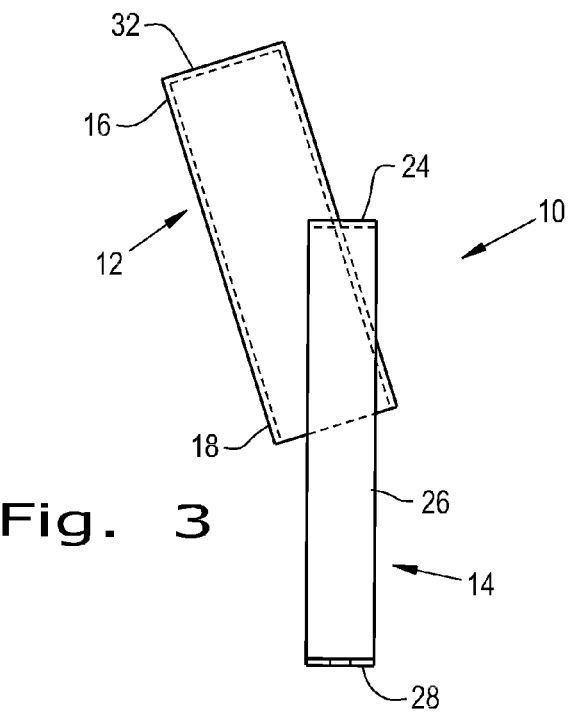

The embodiment of the device 10 represented in FIGS. 1 through 4 further includes an arm 14 that is directly attached to the enclosure 12 by a metallurgical joint 34, for example, a weld joint. The arm 14 is represented in the Figures as having at least three arm portions 24, 26, and 28. A first of the arm portions 24, 26, and 28 is referred to herein as an upper arm portion 24 that is permanently attached to the enclosure 12, and more particularly to the enclosure 12 at or adjacent its upper end 16, though it is also foreseeable that the arm 14 could be attached at or adjacent the lower end 18 of the enclosure 12 or at one or more locations therebetween. A third of the arm portions 24, 26, and 28 is referred to herein as a lower arm portion 28, and is permanently joined to the upper arm portion 24 by an intermediate arm portion 26. As used herein, the terms "permanent" and "permanently" are used to denote a form of attachment whose detachment would require cutting or breaking resulting in damage to the portions being separated. As shown in FIGS. 1 and 2, the metallurgical joint 34 can provide such a permanent attachment, because the arm 14 cannot be simply disassembled from the enclosure 12 and instead separation of the enclosure 12 and arm 14 would require cutting, breaking, or otherwise damage to at least some portion of the device 10.

FIGS. 1 and 2 show the arm 14 and its arm portions 24, 26, and 28 as being a single unitary piece. The unitary piece can be formed by, for example, forging or another process capable of forming the arm portions 24, 26, and 28 as regions of the unitary piece. The upper and intermediate arm portions 24 and 26 and the intermediate and lower arm portions 26 and 28 are shown as being connected by bends 36 and 38 formed in the unitary piece. The embodiment of FIGS. 1 through 4 represents the upper and lower arm portions 24 and 28 as roughly parallel to each other and the intermediate arm portion 26 as transverse thereto. In addition, the upper arm portion 24 is shown as not disposed on a radial of the cylindrical shape of the enclosure 12, but instead is offset from a longitudinal axis of symmetry of the enclosure 12 so as to coincide with a chord of the cylindrical shape. From FIG. 3, it can be further seen that the second arm portion 26 is not parallel to the axis of the enclosure 12, but is skewed so as to be disposed at an angle of roughly about 20 to about 30 degrees to the axis so as to orient the axis of the enclosure 12 roughly normal to a sloping, nonhorizontal surface of a panel on which the joystick 52 is located in FIG. 4. Of course, the device 10 can be manufactured so that the orientation of the axis of the enclosure 12 is tailored to correspond to the orientation of the joystick for any particular man lift or other machinery on which the device 10 is desired to be installed.

For the purpose of being installed on the man lift 50 as seen in FIG. 4, the arm 14 is shaped so that its lower arm portion 28 is closer to the lower end 18 of the enclosure 12 than to the upper end 16 of the enclosure 12. The lower arm portion 28 comprises a through-hole 30 sized and configured to enable the shackle 56 of the lock 54 to pass therethrough. Though the through-hole 30 is represented as being an opening punched, drilled or otherwise formed in the arm 14, it should be understood that the arm 14 could be formed to have various other features capable of being engaged with a shackle to secure a lock to the device 10. The shackle 56 is shown as also passing through a frame 58 or other suitable structure on the man lift 50 so that the device 10 is locked on the man lift 50 and, more particularly, the lock 54 prevents access to the joystick 52 and removal of the joystick 52 from the enclosure 12. While the lock 54 is shown as being of a type having a shackle 56 sized to pass through the through-hole 30 in the arm 14, it should be understood that other types of locks could be employed as long as the lock has a structural feature capable of securing the arm 14 of the device 10 to the frame 58 (or other suitable structure on the man lift 50) so that access or at least operation of the joystick 52 is prevented.

From the above, it should be understood that use of the theft-deterrence device 10 to deter the theft and misuse of the man lift 50 entails installing the device 10 on the man lift by placing the enclosure 12 over the top of the joystick 52, such that the joystick 52 passes through the opening 22 at the lower end 18 of the enclosure 12 until the interior cavity 20 accommodates the entire joystick 52, or at least a portion of the joystick 52 sufficient to prevent operation of the joystick 52. The device 10 can then be secured to the man lift 50 with the lock 54 (or other suitable means) by passing the shackle 56 of the lock 54 through the through-hole 30 in the lower arm portion 28 and around the frame 58 or other suitable structure of the man lift 50.

In view of the above, it can be seen that a significant advantage of this invention is that the device 10 is relatively simple and can be quickly installed to prevent access to and operation of the joystick 52, which in turn prevents theft and misuse of the man lift 50 (or other machinery). The device 10 can also be easily removed by those having a key or other suitable device to unlock the type of lock used to secure the device 10 to the man lift 50.

While the invention has been described in terms of a specific design for deterring theft and misuse of a man lift, it is apparent that other forms could be adopted by one skilled in the art. For example, the device could differ in appearance and construction, the functions of each component of the device could be performed by components of different shape and/or construction but capable of a similar function, and appropriate materials could be substituted for those noted. Accordingly, it should be understood that the invention is not limited to the specific embodiment illustrated in the Figures, and therefore the scope of the invention is to be limited only by the following claims.

The invention claimed is:

1. A theft-deterrence device installed on machinery that comprises controls for operating the machinery, the controls including a joystick located on a nonhorizontal surface of the machinery, the theft-deterrence device comprising:

an enclosure having a first end, an oppositely-disposed second end, an interior cavity defined by and between the first and second ends, and an opening in the second end and in communication with the interior cavity, the opening being sized to enable the joystick to pass therethrough into the interior cavity and the interior cavity accommodating a majority of the joystick to prevent operation of the joystick; and an arm having at least first, second and third arm portions, the first arm portion being permanently attached to the enclosure, the second arm portion permanently joining the first and third arm portions; and a lock for locking the enclosure to the machinery;

wherein the second arm portion is not parallel to a longitudinal axis of the enclosure so as to orient the longitudinal axis of the enclosure about normal to the nonhorizontal surface of the machinery.

2. The theft-deterrence device according to claim 1, wherein the first end of the enclosure is completely closed by a wall to prevent access to the interior cavity through the first end.

3. The theft-deterrence device according to claim 1, wherein access to the interior cavity is solely through the opening in the second end of the enclosure.

4. The theft-deterrence device according to claim 1, wherein the arm is directly attached to the enclosure by a metallurgical joint that directly joins the first arm portion to the enclosure.

5. The theft-deterrence device according to claim 1, wherein the first arm portion of the arm is permanently attached to the enclosure such that a longitudinal axis of the first arm portion located through a midpoint of the first arm portion is laterally offset from a longitudinal axis of the enclosure such that the longitudinal axis of the first arm portion and the longitudinal axis of the enclosure do not intersect.

6. The theft-deterrence device according to claim 1, wherein the second arm portion is transverse to the first and third arm portions.

7. The theft-deterrence device according to claim 6, wherein the second arm portion is about 20 to about 30 degrees to a longitudinal axis of the enclosure.

8. The theft-deterrence device according to claim 6, wherein the third arm portion is closer to the second end of the enclosure than to the first end of the enclosure.

9. The theft-deterrence device according to claim 1, wherein the first, second, and third arm portions are regions of a single unitary piece, the first and second arm portions are interconnected by a first bend in the unitary piece, and the second and third arm portions are interconnected by a second bend in the unitary piece.

10. The theft-deterrence device according to claim 1, wherein the first, second, and third arm portions are upper, intermediate, and lower portions, respectively, of the arm, and the first and second ends of the enclosure are upper and lower ends, respectively, of the enclosure.

11. The theft-deterrence device according to claim 1, wherein the lock comprises a locking device locking the theft-deterrence device to the machinery, the locking device comprising a shackle that passes through a through hole of the third arm portion.

12. The theft-deterrence device according to claim 1, wherein the interior cavity encloses the entirety of the joystick.

13. A method of installing the theft-deterrence device according to claim 1 to deter theft and misuse of the machinery, the method comprising:

installing the theft-deterrence device on the machinery, the installing step comprising passing the joystick through the opening into the interior cavity of the enclosure so that the interior cavity encloses at least a portion of the joystick sufficient to prevent operation of the joystick; and then locking the theft-deterrence device to the machinery with the lock, the lock comprising a shackle that passes through a through hole of the third arm portion, the lock preventing removal of the joystick from the enclosure.

14. The method according to claim 13, wherein the interior cavity encloses the entirety of the joystick.

15. A method of deterring theft and misuse of machinery comprising controls that include a joystick located on a nonhorizontal surface and configured for operating the machinery, the method comprising:

installing a theft-deterrence device on the machinery, the installing step comprising passing the joystick through an opening into an interior cavity of an enclosure of the theft-deterrence device so that the interior cavity encloses at least a portion of the joystick sufficient to prevent operation of the joystick; and then locking the theft-deterrence device to the machinery with a locking device that comprises a shackle that passes through a through-hole of the theft-deterrence device, the locking device preventing removal of the joystick from the enclosure;

wherein the theft-deterrence device comprises an arm having at least first, second and third arm portions, the first arm portion is permanently attached to the enclosure, the third arm portion comprises the through-hole, and the second arm portion joins the first and third arm portions, and the third arm portion is closer to a second end of the enclosure than to a first end of the enclosure, the second arm portion is not parallel to a longitudinal axis of the enclosure so as to orient the longitudinal axis of the enclosure about normal to the nonhorizontal surface of the machinery.

16. The method according to claim 15, wherein the interior cavity encloses the entirety of the joystick.

17. The method according to claim 15, wherein the enclosure has oppositely-disposed first and second ends that define therebetween the interior cavity, and the second end defines the opening therein.

18. The method according to claim 17, wherein access to the interior cavity is solely through the opening in the second end of the enclosure.

19. The method according to claim 17, wherein the first arm portion of the arm is permanently attached to the enclosure such that a longitudinal axis of the first arm portion located through a midpoint of the first arm portion is laterally offset from a longitudinal axis of the enclosure such that the longitudinal axis of the first arm portion and the longitudinal axis of the enclosure do not intersect.

\* \* \* \* \*